US011155383B2

(12) United States Patent
Brooks

(10) Patent No.: US 11,155,383 B2
(45) Date of Patent: Oct. 26, 2021

(54) REUSABLE CUP

(71) Applicant: POCKET ENTERPRISES LIMITED, London (GB)

(72) Inventor: Andrew Brooks, Chichester (GB)

(73) Assignee: Pocket Enterprises Limited, London (GB)

(*) Notice: Subject to any disclaimer, the term of this patent is extended or adjusted under 35 U.S.C. 154(b) by 215 days.

(21) Appl. No.: 15/741,260

(22) PCT Filed: Jun. 30, 2016

(86) PCT No.: PCT/IB2016/053945
§ 371 (c)(1),
(2) Date: Dec. 30, 2017

(87) PCT Pub. No.: WO2017/006224
PCT Pub. Date: Jan. 12, 2017

(65) Prior Publication Data
US 2018/0194517 A1 Jul. 12, 2018

(30) Foreign Application Priority Data
Jul. 3, 2015 (GB) ...................................... 1511689

(51) Int. Cl.
*B65D 21/08* (2006.01)
*B65D 81/38* (2006.01)
(Continued)

(52) U.S. Cl.
CPC ....... *B65D 21/086* (2013.01); *A47G 19/2272* (2013.01); *B65D 21/0219* (2013.01);
(Continued)

(58) Field of Classification Search
CPC .............. B65D 21/086; B65D 21/0219; B65D 43/0231; B65D 47/089; B65D 51/1688;
(Continued)

(56) References Cited

U.S. PATENT DOCUMENTS 8,336,732 B1 * 12/2012 Tobias ................... B65D 1/265
220/671
8,561,830 B2 * 10/2013 Hallberg .............. B65D 23/104
220/592.17
(Continued)

FOREIGN PATENT DOCUMENTS

DE 202014101047 U1 7/2014

OTHER PUBLICATIONS

Notification of Transmittal of the International Search Report and the Written Opinion of the International Searching Authority, PCT/IB2016/053945, dated Sep. 9, 2016.

*Primary Examiner* — Steven A. Reynolds
*Assistant Examiner* — Javier A Pagan
(74) *Attorney, Agent, or Firm* — William H. Bollman

(57) ABSTRACT

The present invention relates to a reusable cup comprising a cup body formed from a liquid impervious, flexible material, the cup having an upper portion, a middle portion and a base portion, and having foldable pre-forms arranged so as to define at least a first folding hinge around a first circumferential location interposed between the middle portion and the upper portion, and a second folding hinge around a second circumferential location, separate from the first circumferential location, interposed between the base portion and the middle portion, an outer peripheral band is formed around the middle portion of the cup to provide a central band, wherein the cup body is foldable into itself, at the circumferential locations, so as to adopt a nested, concentric form.

39 Claims, 10 Drawing Sheets

(51) Int. Cl.
  *B65D 43/02* (2006.01)
  *B65D 47/08* (2006.01)
  *A47G 19/22* (2006.01)
  *B65D 21/02* (2006.01)
  *B65D 51/16* (2006.01)

(52) U.S. Cl.
  CPC ....... *B65D 43/0231* (2013.01); *B65D 47/089* (2013.01); *B65D 51/1688* (2013.01); *B65D 81/3865* (2013.01); *B65D 81/3876* (2013.01); *B65D 2205/00* (2013.01); *B65D 2251/01* (2013.01); *B65D 2251/1008* (2013.01); *B65D 2543/00046* (2013.01); *B65D 2543/00092* (2013.01); *B65D 2543/00231* (2013.01); *Y02W 30/80* (2015.05)

(58) Field of Classification Search
  CPC ............ B65D 81/3865; B65D 81/3876; A47G 19/22; A47G 19/2205; A47G 19/2227; A47G 19/2272
  See application file for complete search history.

(56) References Cited

U.S. PATENT DOCUMENTS

| | | | |
|---|---|---|---|
| 10,464,711 B2 * | 11/2019 | Tsui | A47J 27/21008 |
| 2015/0041478 A1 * | 2/2015 | Abrams | B65D 21/086 |
| | | | 220/592.17 |
| 2015/0251808 A1 * | 9/2015 | Tsui | A47L 19/04 |
| | | | 220/8 |

\* cited by examiner

SIDE ELEVATION
LARGE CONFIGURATION

SIDE ELEVATION
SMALL CONFIGURATION

REUSABLE CUP

FIELD

The present invention relates to reusable cups.

BACKGROUND

Over the last 20 to 30 years there has been a surge in the number of outlets that serve drinks in take-out vessels, particularly disposable paper cups. This has led to an increase in takeaway packaging, particularly paper-based packaging.

In a report on processing of hot drink cups for the city of Toronto by Entec Consulting Ltd, May 2009, findings confirmed that around 1 million paper disposable cups were disposed of every day and that the vast majority of these were destined for landfill in nearby Michigan State. Recycling was deemed impractical and uneconomic because of the expense of separating the plastic lining material from the paper card.

In practice therefore billions of plastic-lined paper cups are being manufactured from virgin lumber every year globally. Used once, they are often simply buried in landfills due to the expense and complexity of recycling them.

Corporations are increasingly under social, political and legal pressures to reduce their dependence on disposables. Meanwhile, consumers have become accustomed to the convenience of take-out disposables and rarely refill their own cups at coffee shops or fast food restaurants. In 2015, Starbucks released data (Starbucks 2014 CSR report published in March 2015) that suggested that 98.2% of their takeout drinks were served in paper disposable cups. Only 1.8% of consumers used 'reusables'. This is, in large part, due to the inadequacies of existing reusable cups presently available.

Market research referenced in another study commissioned by the city of Toronto (hot drink cup strategy: Research on Behaviour Change, Kelleher Environmental, Apr 2009) concluded that consumers often forgot to bring their cups with them due to their bulkiness. In essence, a typical reusable cup is designed for car use, not for carrying around on your person. They do not conveniently replace the function of a disposable paper cup which is on hand and easily portable when required.

Additionally, suppliers of packaging materials have been penalised in some jurisdictions by way of an "environmental tax" which in the UK is often referred to as a landfill tax. These taxes, together with legislative targets and a complex system of incentives to suppliers and retailers, (known as packaging recycling notes (PRNs) in the UK), have to some extent helped to improve recycling of some materials, but there remains a huge waste of energy to produce paper based products, as well as the devastating effects such demands place on natural resources, such as forests.

It was reported in the aforementioned study that cups were still filled with liquid and were considered "contaminated" and therefore unsuitable for recycling. Also many cups still often had their lids and paper insulating sleeves which were considered labour intensive to separate. Added to the difficulty and expense of separating the plastic and wax lining from the paper, the vast majority of these cups are considered uneconomic to recycle. Over recent years therefore attempts have been made to provide a reusable cup in order to reduce the demand for paper and wood pulp.

PRIOR ART

An example of a reusable cup is described in U.S. Pat. No. 8,267,271 (David Farris). U.S. Pat. No. 8,267,271 discloses a collapsible beverage container comprising: a plurality of co-axially oriented, concentric cylindrical wall sections of progressively different diameters. The cylindrical wall sections have a smooth inner surface and are extendable from a collapsed position (in which cylindrical wall sections overlap in an axial direction), to an extended position (in which cylindrical wall sections only partially overlap in an axial direction). One or more elastomeric gaskets are provided between adjacent cylindrical wall sections. Each gasket provides a liquid-tight seal along the entire extension of the inner surface of adjacent cylindrical wall sections between the extended and collapsed positions, so that any remaining beverage remains sealed inside the beverage container when in the collapsed position.

Another example of a reusable cup is described in International Patent Application WO-A1-2013/155020 (Karla Zens). WO-A1-2013/155020 discloses a collapsible container that includes: a bottom cup having a circular base and a cylindrical wall attached to the circular base. The cylindrical wall includes a cup lip formed along an edge of the cylindrical wall.

The cylindrical wall also includes a number of bottom cup guide tabs formed along the cup lip. A middle sleeve has a middle sleeve upper edge and a middle sleeve lower edge. The middle sleeve cylinder nests at the bottom cup. The middle sleeve includes a number of middle sleeve guide channels for sliding engagement of the bottom cup guide tabs. The middle sleeve also includes a middle sleeve gasket channel configured for receiving a middle sleeve gasket.

Further examples of reusable cups are disclosed in United States Patent Applications US2015041478 A1 (Urban Tumbler) and US2015251808 A1 (Tsui).

US2015041478 A1 discloses a reusable collapsible travel tumbler comprising a container made of a flexible material which contains a liquid beverage. A rigid collar is removably fixed to the upper, outermost stage of the flexible material and a rigid lid is removably fixed to the rigid collar. When the collapsible container is in its extended position, the tumbler acts as a receptacle for hot or cold beverages and the rigid collar provides a surface for the consumer to grip. The user drinks the beverage through a sealable hole in the rigid lid. When the collapsible tumbler is not holding any liquid, the tumbler may be folded into a low volume shape for storing and transporting the device.

US2015251808 A1 discloses a collapsible cup including a collapsible wall structure comprising a generally annular top tier; a bottom tier including a generally horizontal support surface; and a collapsible wall section that connects the top tier to the bottom tier. The collapsible wall section includes at least three stacked, generally annular tiers, at least a middle one of which is rigid, being formed from a different material than adjacent flexible tiers that are disposed above and below the middle tier. The top and bottom tiers of the container may also be rigid and formed from a different material than the flexible tiers of the collapsible wall section. The collapsible wall section, top tier, and bottom tier collectively define a container body having a top opening, a generally closed bottom which comprises the generally horizontal support surface of the bottom tier, and a generally closed peripheral section comprising at least a part of the top tier and at least a part of the collapsible wall section.

The flexible tiers are configured to fold between relatively expanded and relatively collapsed positions. The size of the container volume can be increased by folding at least one of the flexible tiers from a relatively collapsed to a relatively expanded position and can be decreased by folding at least one of the flexible tiers from a relatively expanded to a relatively collapsed position. The cup further includes a handle pivotally connected to its top tier. When the cup is fully collapsed, the handle is configured to pivot into a position in which a portion of the handle extends beneath and generally parallel to the bottom tier of the cup.

The aforementioned cups each suffer from a number of drawbacks. For example, the cup disclosed in U.S. Pat. No. 8,267,271 comprises a series of nested or concentric cylindrical portions which are bounded by way of one or more O-ring seals confined in a recess so as to permit nested portions to telescope and expand, thereby defining a volume for receiving liquid.

However, a first drawback with the aforementioned cup has been the tendency for debris and residue (and therefore bacteria) to accumulate in the peripheral region between O-ring seals and inner surfaces of the relevant collapsing cup wall portion. Additionally, the cup requires a locking process which otherwise compromises the safety of the cup when filled with hot liquid. Finally, the cup is top heavy; the base being significantly smaller than the top drinking rim which makes it prone to toppling.

The cup described in WO-A1-2013/155020 also suffers from drawbacks in that repeated folding, which arises as a result of opening and closing the cup, has tended to weaken hinges thereby increasing the risk of a hinge failing. The consequence of the hinge failing is rupture of an internal cup material resulting in leakage of contents of the cup or drops from an empty cup when stowed in a bag or pocket, even though a liquid tight lid may be on the cup.

The cup disclosed in US2015041478 A1 thermally insulates a user's hand by way of a relatively thick rigid collar around its upper outermost stage. This collar, combined with the relatively narrow and flexible base of the cup may result in the cup being unstable, increasing the risk of the cup tipping or being knocked over and so spilling its contents.

Furthermore, collapsible wall section of the cup disclosed in US201504141478 comprises significantly thinner articulating stages which reduce the thermal insulation provided by the wall and the force required to collapse the cup. This increases the risk of the cup being accidentally collapsed while in use.

The collapsible wall structure of the cup disclosed in US2015251808 A1 does not provide any thermal insulation to a user, necessitating the use of the handle, or some additional insulating device.

An aim of the present invention is to provide a reusable and versatile cup which does not suffer from any of the aforementioned drawbacks.

The present invention provides a reusable cup which is convenient to carry, safe to use, does not leak and has a long life.

SUMMARY OF THE INVENTION

According to a first aspect of the present invention there is provided a reusable cup comprising a cup body formed from a liquid impervious, flexible material, the cup having an upper portion, a middle portion and a base portion, and having foldable pre-forms arranged so as to define at least a first folding hinge around a first circumferential location interposed between the middle portion and the upper portion; and a second folding hinge around a second circumferential locations, separate from the first circumferential location, interposed between the base portion and the middle portion, an outer peripheral band is formed around the middle portion of the cup to provide a central band, wherein the cup body is foldable into itself, at the circumferential locations, so as to adopt a nested, concentric form.

Preferably the central band has ridges, indentations, undulations or crenellations formed thereon so as to provide thermal insulation.

Preferably ridges, indentations, undulations or crenellations are formed on the outer surface of the central band.

Alternatively, or additionally, ridges, indentations, undulations or crenellations may be formed on the inner surface of the central band.

Ideally the reusable cup is formed from a single shot of liquid impervious flexible material so as to define a continuous inner surface with regions formed around the cup body defining the foldable pre-forms and operating in a similar manner to a hinge, whereby when stowing the cup from a deployed state, the body of the cup is folded back on itself in the form of an S-form, at each hinge so that the wall of the cup folds in a fluted or concertina like manner.

Ideally the base portion of the cup folds up and into the central portion of the cup and the top portion folds over the exterior of the central portion of the cup.

Preferably the cup is capable of being deployed into at least two forms and preferably into at least three different forms, each of the deployed forms providing a different capacity. These capacities are ideally small (175 ml), medium (300 ml) and large (475 ml). These capacities have been found to suit the sizes of many chains of coffee outlets, and variable capacity allows a user to use the same cup for a variety of differently sized beverages. This variable capacity is ideally achieved by deploying the lower portion of the cup (and keeping the upper portion collapsed) so as to provide a small size cup such as an espresso cup; or by deploying the upper portion of the cup (and keeping the lower portion collapsed) so as to provide a medium size cup; or by deploying both the lower and upper portions simultaneously so as to provide a large size cup.

It is felt that an increasing number of environmentally aware and relatively affluent markets are more receptive to buying a reusable cup that is convenient to carry on their person ready to refill during the day. The invention therefore provides a cup that is easy to hold, easy to deploy from one size to another, easy to fill, easy to drink from, easy to seal and unseal, easy to clean and easy to collapse and carry.

The Shore hardness of the impervious flexible material may be greater than 20A, is preferably greater than 30A, more preferably greater than 40A and most preferably greater than 50A. The Shore hardness of the impervious flexible material may be less than 70A, is preferably less than 60A.

In some preferred embodiments the Shore hardness is 55A

In some embodiments the Shore hardness of the impervious flexible material is between 20A and 40A Ideally the thickness of the flexible material, which forms the cup body is ideally greater than 1 mm. Ideally the thickness of the flexible material is less than 2 mm.

These dimensions and sizes have been found to be suitable to accommodate a cup whose contents is typically less than 1 litre. In such sizes it has been found that the material from which the cup body is formed has to flex sufficiently, whilst still retaining its shape and has to provide insulation, as the cup contains hot contents. Satisfying these two criteria enables the cup to be held and used without an additional cardboard sleeve. A target range of liquid temperature is around 85° C.

The cup is formed from food safe materials. Preferably the cup is formed from approved food grade materials. For example, the cup may be formed from a food grade material approved by the United States Food and Drug Administration (FDA).

The flexible material used to form the cup body may be a thermo plastic elastomer (TPE). TPE materials are advantageously light and odourless, reducing the weight of the cup and ensuring the cup does not affect the flavour of the cup's contents.

TPE materials are advantageously heat resistant, for example, the cup may be formed from a material capable of sustaining temperatures in excess of 90° C. TPE materials advantageously also have high impact strength which increases the durability of the product and allows the cup to withstand impacts and/or falls, regardless of whether the cup is collapsed, partially collapsed, deployed, empty or filled with hot or cold liquids. Furthermore, TPE materials are advantageously tear resistant, which allows the cup to withstand repeated uses, as the flexible hinges are stressed each time the cup is collapsed or deployed.

In some alternative embodiments, the flexible material which forms the cup is a silicone material. Silicone materials advantageously liquid impervious, this prevents ingress into the material thereby preventing stains and odour. Silicone materials also have high heat resistance.

Preferably, the cup body has a smooth inner surface. This acts to prevent the build of debris and/or bacteria and facilitates the cleaning of the cup. These features make the cup more hygienic.

Ideally the cup comprises a lid, which ideally has an internal threaded portion that connects to the cup. In some embodiments the internal threaded portion of the lid corresponds to an external threaded portion on an upper band formed around the upper portion of the cup. The upper band may be fixed to and/or formed integrally with the cup body. The lid provides additional strength and rigidity to the cup, and acts to prevent the upper portion of the flexible cup body from being inadvertently compressed when the cup is in use. The lid additionally acts to retain liquids within the cup and enables the user to drink the contents of the cup, whilst moving, at the same time reducing the risk of spilling the contents of the cup.

In some embodiments the lid has a raised rim which projects from the top of the lid adjacent the perimeter of the lid. The raised rim may have a flat top upon which a drinking aperture may be located. The raised rim ideally has an interior radius slightly greater than the radius of the base of the cup, thereby facilitating stacking of a plurality of such cups. The radius of the inner rim may be slightly less than the radius of the flexible cup body at its opening, thereby ensuring that the drinking aperture is located above the main cavity of the cup and adjacent to the edge of the cavity. This minimizes liquid residue which allows a user to effectively finish their drink and to ensure the cup is empty for storage or transport.

Preferably the lid comprises a slot, through which the user may drink a beverage. The slot may be located at the top of the raised rim. The raised rim may project further from the upper surface of the lid closer to the slot, thereby enabling a user's lips to have sufficient purchase around the rim. The lid preferably comprises an air pressure aperture. The air pressure aperture is preferably smaller than the drinking aperture and may be located substantially in the centre of the lid. The air pressure aperture equalises the pressure on the inside and the outside of the cup, thereby ensuring there is an even flow of liquid through the drinking aperture.

Preferably, the interior of the lid comprises a circular internal ridge with a radius very slightly smaller than the radius of the aperture of the flexible cup body and arranged such that when the lid is attached to the cup the ridge projects downwards from the inner surface of the lid and in use presses against the interior surface of the flexible cup body. The tightening of a threaded cup lid onto the cup causes the ridge to press against the flexible cup body more tightly, thereby providing an additional seal between the lid and the flexible cup body. The lip may be approximately 0.5 mm thick.

Preferably the lid comprises a stopper which seals the drinking aperture. The stopper may comprise a hinged arm with a bung dimensioned to fit inside the drinking aperture or slot of the lid so as to provide a tight seal.

Preferably, when the arm is in its closed arrangement (with the bung sealing the drinking aperture) the end of the arm protrudes beyond the edge of the raised lip and/or the edge of the lid. This allows a user to easily open the stopper by gaining purchase on the arm, which allows the stopper to have a tighter seal, without increasing the difficulty of opening the aperture.

Preferably when the stopper is in a closed configuration, such that it seals the drinking aperture, the stopper also seals the air pressure equalising aperture or hole, and when the stopper is in an open configuration, where the stopper is removed from the drinking aperture, the stopper does not seal the air pressure hole. For example, the stopper may comprise an arm hinged at one end, with a bung adjacent the second end, the bung being arranged to engage and seal the drinking aperture when the arm is in a closed configuration. Optionally, a post projects from the arm adjacent the first end, the post being arranged such that it presses against the air pressure equalising aperture when the arm is in a closed configuration so as to provide a tight liquid impervious seal.

Preferably the stopper is arranged to produce an audible click, confirming positive engagement, when the stopper seals or unseals the drinking aperture. The lid may comprise one or more clips which act to retain the stopper in its closed configuration and which optionally produces an audible click when the stopper is transitioned into and out of its closed configuration. Furthermore, the clips may increase the force necessary to remove the stopper from its closed configuration, thereby preventing the drinking aperture from becoming unintentionally unsealed.

The stopper ideally includes a stopper retention means which acts to hold the stopper in an open configuration, thereby preventing the stopper from inadvertently sealing the aperture. The retention means may be a frictional retention means which acts to hold the stopper in an open configuration, for example when the hinged arm is flipped backwards away from the drinking aperture.

In alternative embodiments, as an alternative to a thread, an inner part of the lid may have a positive engagement means which may be configured to produce an audible click indicating when the lid is sealed around the cup.

Alternatively, an inner lip extension is provided with an O-ring with a softer Shore hardness than the lid thereby improving the seal. Alternatively, a slot is provided which is sealed by a rectangular strip of soft elastomer or rubber compound on the stopper.

In some embodiments, the stopper may include a soft rubber component, with a substantially rectangular cross section, disposed around an edge which compresses against a drinking aperture forming a spill-proof seal.

In preferred embodiments the stopper and/or the bung is formed from a rigid liquid impervious material, such as polypropylene, and is dimensioned to tightly seal the drinking aperture.

Preferably, a slot is formed within the rim of the lid (3 mm×10 mm) so that a user's lips can purse around it for even drinking flow and to minimize spillage.

The lid preferably has a threaded portion so that is can be screwed onto the cup and firmly secured thereto and is able to be twisted off for quick filling of the cup or cleaning of the lid and/or cup.

Another advantage is that, when fitted with a lid, there is a reduced the risk of spillage from the cup.

A further advantage of the lid is that it maintains the contents of the cup at the desired temperature for a longer period by acting as an insulator.

The walls of the cup have peripheral regions or bands formed thereon. The peripheral regions or bands are formed from a material of Shore hardness in excess of 50 Shore D and ideally greater than 70 Shore D.

An example of a material used to form these peripheral regions or bands is polypropylene. One of the outer peripheral regions or bands is formed around a central region of the cup so as to define a central band. An outer peripheral band may be formed around the upper portion of the cup so as to define an upper band. An outer peripheral band may be formed around the base portion of the cup so as to define a base band. The bands serve to provide strength to the cup, comprise a region onto which the flexible cup body may be bonded and provide a thermal barrier when holding the cup with hot contents. Preferably one or more of the bands are formed from polypropylene. More preferably, all of the bands are formed from polypropylene. Polypropylene is advantageously widely recycled and cheap to produce.

In use edges of the bands act as guides about which the flexible material of the cup body is folded. For example, when an upwards force is applied to the bottom of the cup, and/or when a downwards force is applied to the top of the cup, the first folding hinge folds around the upper edge of the central band, and/or the second folding hinge folds around the upper edge of the lower band. The bands may therefore define the circumferential locations of the first and second folding hinges.

Advantageously the bands define the locations of the folding hinges without requiring the flexible cup body to comprise circumferential reduced thickness segments to define the points of articulation. Having no reduced thickness segments increases the strength folding hinges of the cup, such that it is less likely to be accidentally collapsed, and also increases the thermal insulation provided by the cup.

Ideally each band serves a specific function. The top band provides overall strength and a stable platform for the lid to sit on. It also has an external thread formed on it onto which the lid is connected. The upper band may have a quarter turn external thread. This facilitates the removal and attachment of the lid in use while providing a good seal between the lid and the cup body.

The centre or central band provides insulation and additional strength. The band is preferably rigid and is strengthened, thereby enabling a user to grip the cup firmly about its centre without the cup flexible material of the cup collapsing. The central band ideally has ribs, ridges, indentations, undulations or crenellations formed thereon so as to provide thermal insulation. Ribs, ridges, indentations, undulations and/or crenellations may be formed on the inner surface of the band, so as to provide air pockets between the band and the flexible cup body, and/or may be formed on the exterior of the band, where they provide air pockets between the cup and the user's hand. Ribs, ridges, indentations, undulations or crenellations formed on the exterior surface of the band may also provide additional grip for a user holding the cup by the central band.

In some embodiments a series of ridges may be formed on the exterior of the band. The ridges may be horizontal, may be vertical, may be parallel to each other, may be regularly spaced and may cover substantially the entire exterior surface of the band. In some embodiments the ridges cover the entire exterior surface of the band except for one or more regions where a brand and/or logo may be printed and/or embossed on the exterior of the band. An embossed logo may provide insulation in a similar manner to the ridges or indentations, and may be formed during the same manufacturing process as the ridges, or may be added later. In some embodiments the ridges may have a separation greater than 0.5 mm separation, may have a separation less than 1.5 mm, may have a depth greater than 0.5 mm, may have a depth less than 1.5 mm, may have a width greater than 0.5 mm and may have a width less than 1.5 mm.

Alternatively, or additionally, a series of ridges may be formed on the interior surface of the band. The ridges may be vertical, may be horizontal, may be parallel to each other, may be regularly spaced and may cover substantially the entire exterior surface of the band. In some embodiments the ridges may have a separation greater than 3 mm, may have a separation less than 6 mm, may have a depth greater than 0.2 mm, may have a depth less than 1 mm, may have a depth less than 0.5 mm may have a width with greater than 3 mm, may have a width less than 6 mm.

In some embodiments the widths, depths and/or separation of ridges formed on the interior or exterior surfaces of the central band may vary along their length.

The insulation provided by the central band insures the cup does not necessitate the use of disposable insulating paper sleeves thereby reducing waste.

The lower band provides stability when the cup is deployed, preventing the base portion of the flexible cup body from collapsing when pressed against a surface. In some embodiments the base band may protrude below the bottom the of flexible cup body. The bottom of the base band may thereby define a rigid base upon which cup stands. The base band ideally comprises one or more flanges, which may extend radially. These flanges may extend from the bottom edge of the base band, thereby increasing the footprint of the base of the cup and increasing its stability.

Advantageously flanges may also be gripped by a user in order to assist in the deployment of the cup by allowing them to more easily pull the base portion of the cup. In some embodiments the base comprises four radially extending flanges or lips, equally distributed around the circumference of the base. Ideally, the base band comprises a horizontal baseplate, which may partially or entirely cover the base of the flexible cup body and which may be partially or entirely covered by a portion of the flexible cup body. In some embodiments the footprint of the base of the cup fits within the lip of the lid of the cup, thereby facilitating stacking of the cups for storage, display or transport.

The bands may be substantially cylindrical, and may be formed around cylindrical portions of the cup body. The cylindrical portions of the cup body are ideally connected by frusto-conical portions of the cup body which typically comprise the flexible hinges. The bands also serve to provide guides, about which the foldable, flexible material is folded when the cup is collapsed. Furthermore, the lower band provides protection to the folded flexible material when it is in its collapsed state. The folded flexible material also helps as a lever to deploy the cup.

In some embodiments the rim of the flexible cup body may protrude beyond the upper band. Therefore, an uppermost segment of upper portion of the flexible cup body may be located above the band. This segment may extend 0.5 mm beyond the upper edge of the upper band. This uppermost segment may extend radially outwards so as to define a lip which covers the upper edge of the upper band. In use when a lid is attached to the upper band, or screwed onto the upper band, the uppermost segment and/or the lip is compressed between the upper band and the lid. This helps to provide a seal between the cup and the lid.

In some embodiments the flexible cup body may have a plurality of radially extending lips formed thereon. The lips may define the segments of the cup body around which the bands are formed, and may act to hold the bands in place, preventing them from sliding up or down the cup in embodiments where they are not bonded to the cup. For example, lips may be located at the upper edge of the upper portion of the cup body; at the lower edge of the upper portion of the cup body; around the upper edge of the middle portion of the cup body; around the lower edge of the middle of the cup body; around the upper edge of the lower portion of the cup body; or any combination thereof. The lips may define the boundary between the upper, middle and/or lower portions of the cup, and the folding hinges.

In some embodiments one or more of the bands has one or more ridges or indentations formed on its interior surface, which in use contact with one or more indentations or ridges formed on the exterior surface of the portion of the flexible cup body about which the band is formed. These contacting ridges and indentations may act to prevent a band from sliding across the surface of the flexible cup body. For example, a plurality of vertically extending ridges may be formed on the exterior of the upper portion of the cup body and a plurality of corresponding vertically extending indentations may be formed on the interior surface of the upper band.

When the cup is assembled, the vertically extending ridges and indentations lock into each other, thereby preventing the upper band from sliding around the upper portion of the cup body. This may advantageously facilitate in the attachment and/or detachment of the lid from the upper band using a screw thread.

Ideally the thickness of the peripheral bands is between 1 mm and 3 mm. Most preferably the thickness of the band is between 1.5 mm and 2 mm.

The thickness of the central band may be greater than 0.5 mm, may preferably be greater than 1 mm, and may most preferably be greater than 1.5 mm.

The thickness of the central band may be less than 4 mm, may preferably be less than 3.5 mm, and may most preferably be less than 3 mm.

The height of the central band may be between greater than 15 mm, may preferably be greater than 25 mm.

The height of the central band may be less than 70 mm, may preferably be less than 50 mm, and may most preferably be less than 35 mm.

The radius of the cup at the central band may be greater than 18 mm, may preferably be greater than 25 mm and may most preferably be greater than 30 mm.

The radius of the cup at the central band may be less than 50 mm, may preferably be less than 40 mm and may most preferably be less than 34 mm.

In some embodiments one or more bands may be hot bonded onto the flexible cup body. Alternatively, or additionally, one or more of the bands may be attached to the flexible cup body using adhesives. Alternatively, or additionally, one or more of the bands may held in place mechanically.

Bands may be held in place with respect to the flexible cup body mechanically by indents and/or protrusions formed on the cup body. In some embodiments one or more of the bands may be held in place on the body bay radially extending lids which in use contact the upper and lower edges of the band, therefore holding it in place around the cup. Alternatively, or additionally one or more protrusions and/or recesses on the interior surface may interlock with corresponding recesses or protrusions on the outer surface of the flexible cup body.

The peripheral regions or bands may be formed using an injection moulding process. Alternatively, components, such as bands and the flexible material defining the body of the cup may be glued or hot bonded one to another. Thus for example in the aforementioned preferred embodiment three, relatively hard polypropylene bands are hot bonded to a soft inner cup formed from a flexible synthetic plastics material, such as a thermoplastic elastomer, for example, styrene-ethylene-butadiene-styrene (SEBS). The central band, that is formed from a relatively stiff synthetic plastics material, provides rigidity, grip and may have indentations, undulations or crenulations formed thereon so as to provide additional insulation for comfortable handling.

Preferably the, or each, peripheral bands is/are formed from polypropylene or glass filled thermoplastic or thermos set plastic.

Preferably a plurality of horizontal grooves are formed at predetermined depths and with a minimum spacing of 1 mm. It has been found that this arrangement is particularly effective as an insulator of the contents of the cup from the user. It is important that the material thickness tolerances are within (±0.2 mm) so that the flexible cup body is sufficiently sized in order to ensure that it has the correct amount of flexibility as well as the correct amount of rigidity. This optimum combination has been achieved by careful selection of material types and dimensions so as to achieve the aforementioned characteristics whilst still enabling the cup to be folded. Preferably, a plurality of grooves are formed on the central band at depths of at least 1 mm and with minimum spacing of 0.6 mm.

Ideally the material defining a wall of the cup has a small overhang around its upper periphery so as to act as a seal against which the lid abuts. Ideally a stand is included in a base section of relatively rigid material, such as polypropylene, and provides a larger footprint for stability. The base section may be bonded to the cup.

In some embodiments the base band is mechanically connected to the flexible cup body. For example, in some embodiments an inwardly projecting ridge is formed on the interior surface of the base band, which in use interlocks with a slot formed in the base of the flexible cup body. In some embodiments the base band comprises a horizontal base plate with an aperture through which portion of the flexible cup body passes, the flexible cup body comprising a flange which holds the cup body in place with respect to the aperture and the base band.

A notched lip is ideally formed around the base section and this improves stability. Also, the notched lip of the base section has an overhang enabling the user to deploy the bottom part of the cup easier. In the collapsed state, this overhang also protects folded material.

The cup is suited for re-use ideally in excess of fifteen times; preferably in excess of 25 times; and most preferably in excess of 50 times, ideally in excess of hundreds of uses.

In some embodiments the cup may comprise a radio frequency identification (RFID) chip. The RFID chip may for example be located in a thickened portion of the band or the lid of the cup. Preferably, the RFID chip may be configured to track a user's usage of the cup, may be configured to store one or more of a user's preferred beverages to facilitate ordering, may be configured to identify a user (for example for the acquisition of loyalty points), may be configured to enable the cup to act as a digital wallet, may be configured to enable or facilitate mobile payment, or any combination thereof.

Further advantages will become apparent with reference to the detailed description of a preferred embodiment of the cup and to the claims appended hereto.

A preferred embodiment of the cup will now be described with reference to the Figures in which:

DETAILED DESCRIPTION OF A PREFERRED EMBODIMENT OF THE INVENTION

Figure 1:
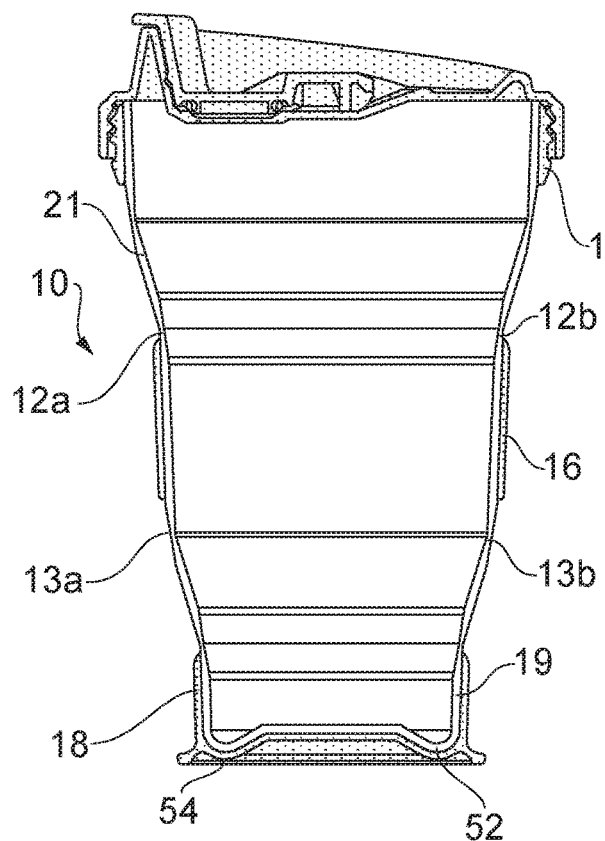
FIG. 1 shows a sectional view of a first embodiment of the cup in a fully deployed configuration.
Figure 3:
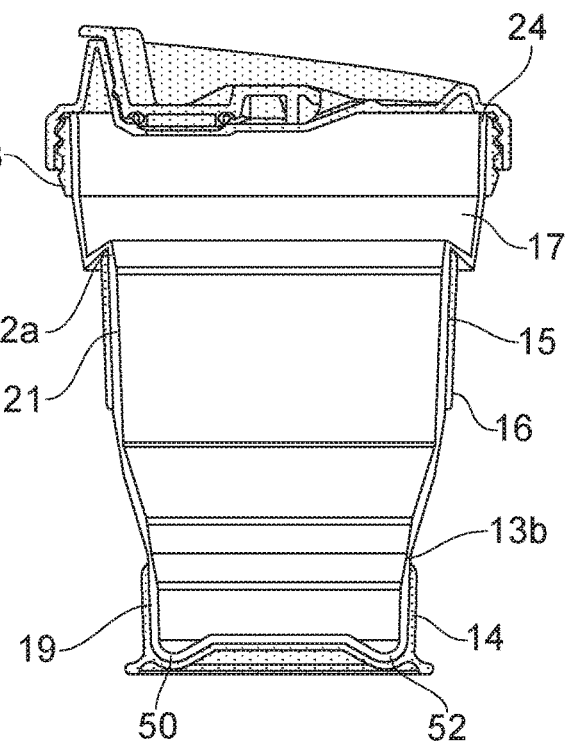
FIG. 3 shows a sectional view of the first embodiment of the cup in a partially collapsed configuration with the upper folding hinge partially folded and the lower folding hinge deployed.
Figure 2:
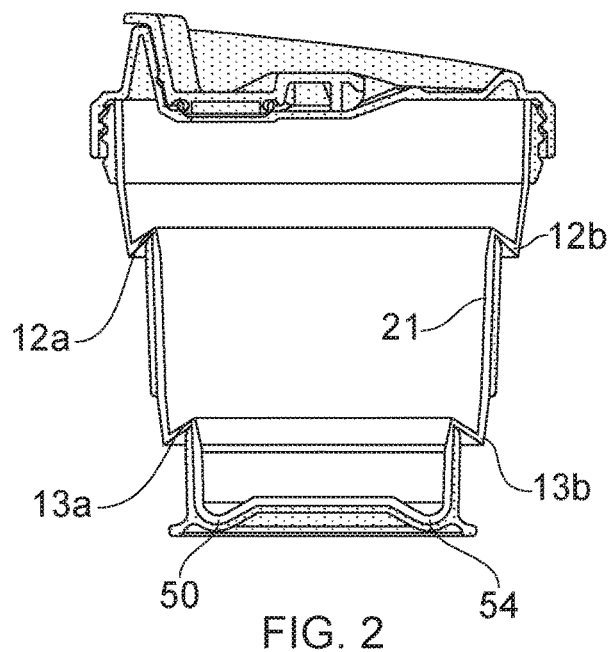
FIG. 2 shows a sectional view of the first embodiment of the cup in a partially collapsed configuration with the upper and lower folding hinges partially folded.
Figure 4:
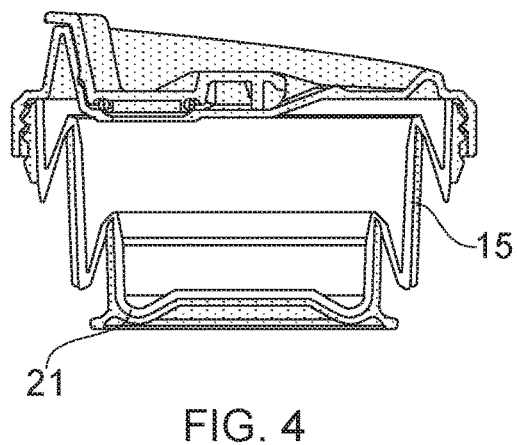
FIG. 4 shows a sectional view of the first embodiment of the cup in a fully collapsed configuration with the upper and lower folding hinges fully collapsed.
Figure 5:
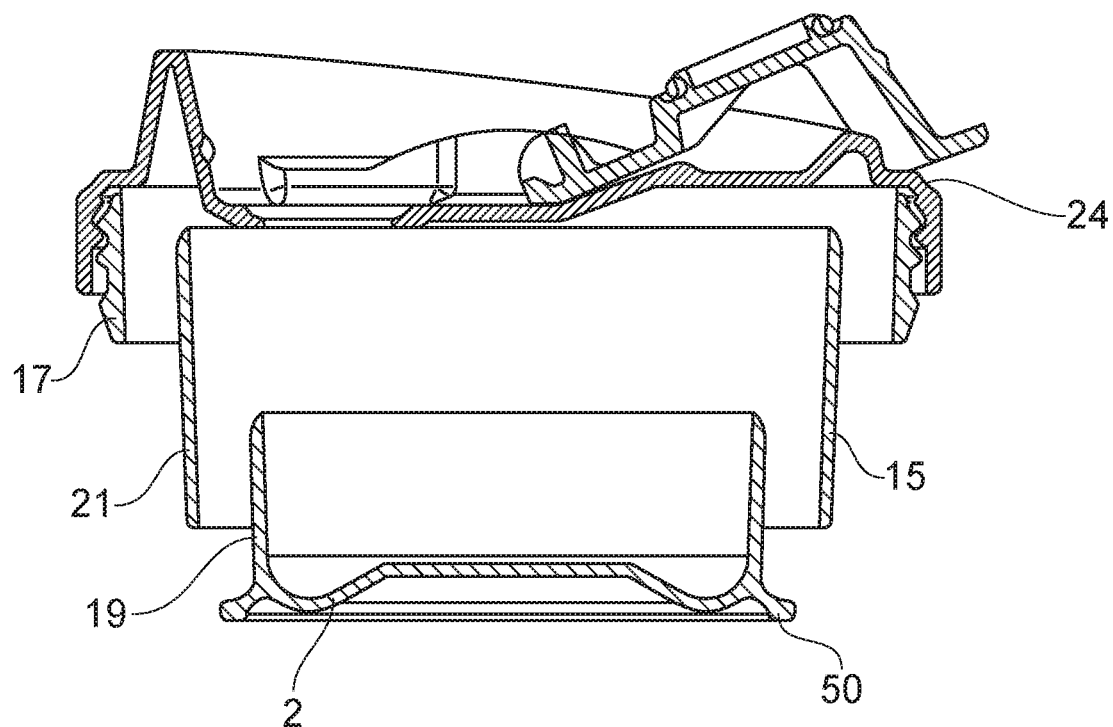
FIG. 5 is a sectional view of the first embodiment cup in a fully collapsed configuration showing only lid and peripheral bands.

Referring to the Figures generally there are shown two embodiments of a reusable cup 10. FIGS. 1 to 7 show the first embodiment of the cup and its lid. FIGS. 8 to 17 show the second embodiment of the cup and its lid. FIGS. 1 to 4 show how the cup 10 is deployed in different configurations by virtue of folding hinges 12a and 12b and 13a and 13b, which are interposed between middle 15 and upper 17 portion of the cup 10 and bottom 19 and middle 15 portions, respectively.

Cup 10 comprises a liquid impervious, flexible material 21 having foldable pre-forms arranged to define at least two sets of hinges 12a and 12b, and 13a and 13b around separate circumferential locations on the cup body whereby the material 21 from which the cup body is formed is foldable into itself, at the circumferential locations, so as to adopt the form of two nested, concentric forms (FIG. 4), shown as S-shaped forms in section in FIG. 1.

The flexible material 21, which is typically a thermo plastic elastomer (TPE), from which the cup 10 is formed, is food safe, ideally approved by the United States Federal Drug Administration (FDA), mechanically strong and stable. Other synthetic plastics material may be used as the cup body provided they possess the necessary features of food safety, flexibility, thermal insulation and durability to repeated folding.

Peripheral bands 14, 16 and 18 are bonded to an outer surface of the flexible material 21 which is heat resistant and liquid proof. The peripheral bands 14, 16, 18 are formed from FDA-approved polypropylene. Bonding of different materials forming the cup is achieved by moulding the thermo plastic elastomer directly onto the polypropylene. The heat within the thermo plastic elastomer melts the surface of the polypropylene allowing cross linking and thereby creating a strong bond. Alternatively, it is possible to join the parts with a suitable adhesive but this may require surface treatment such as plasma or chemical primer.

The cup is free from bisphenol (BPA) and requires no phthalates or glues in the assembly of the cup. This allows the cup to adhere to food safety standards.

Band 14 is a base portion, band 16 is a central band and band 18 is an upper band. Sufficient excess flexible material 21 is provided around an upper periphery 24 at a lip or collar region of a bond zone between the body of the flexible material 21 and the upper band 18 so as to provide a surface against which a lid 30 may abut and seal the cup 10.

An additional fillet of flexible material 21 is provided at hinges 12a and 12b, and 13a and 13b so as to ensure that folding of the cup body material 21 is permitted without risk of tearing. The hinges 12a and 12b and 13a and 13b define hinges which optimise the balance between thicknesses of material 21 required in order to retain an overall cup shape of the cup 10 whilst being sufficiently thin and durable in order to permit repeated folding.

An advantage of the central band 16, which is effectively of the form of a part of a cylinder, provided around the external surface of the middle region of the cup 10, is that it acts as a thermal barrier and so enables the user to grasp the cup 10 with relatively hot contents safely. The central band 16 is ideally at least 20 mm deep, preferably at least 30 mm deep, so as to provide a surface onto which branding may be placed as well as providing a large area for holding the cup.

Also the central portion or band 16 offers a large surface area onto which the cup body may be bonded so improving strength and enabling tapering sections 22 and 24 of the body 21 to be defined between the upper and middle portions; and middle and lower portions of the cup 10. Not only is this aesthetically and ergonomically pleasing but it also increases stability and strength of the cup 10. The thickness of the central band 16 may be thicker than the other bands so providing an additional layer of insulating material.

Another advantage of the cup is that it has few separate parts. Prior art cups had more parts which are liable to fail, be lost or require additional assembly costs and cleaning.

Due to the tapering nature of frusto-conical connecting sections 22 and 24 the cup 10 adopts a form that is convenient to grasp whilst maintaining its overall cup shape state whilst standing on its base 14. The cup 10 requires sufficient stiffness in order to ensure that, even when filled with a hot liquid, it retains its form. Therefore, the conical angle of the frusto-conical sections 22 and 24 cannot be so shallow as to compromise strength and stability of the deployed cup 10; neither can they be so steep as to prevent or inhibit folding of the hinges 12a and 12b and 13a and 13b. It has been found that a range of conical angles between 10° and 20° is ideal to meet these objectives. This range of angles enables the cup 10 to retain a shape that is similar to an existing cup whilst still permitting the cup 10 to be folded.

Figure 6:
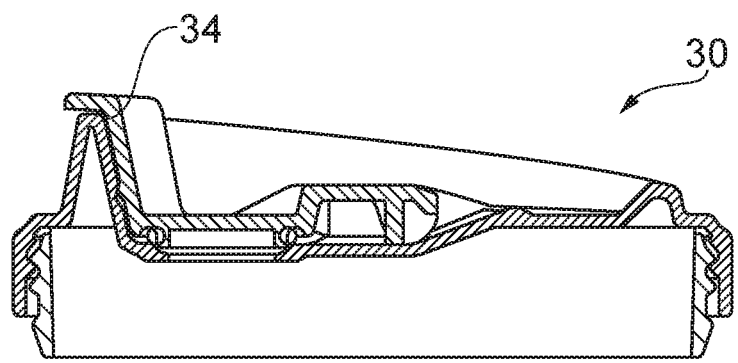
FIG. 6 is a sectional view through the lid for the first embodiment of the cup.
Figure 7A:
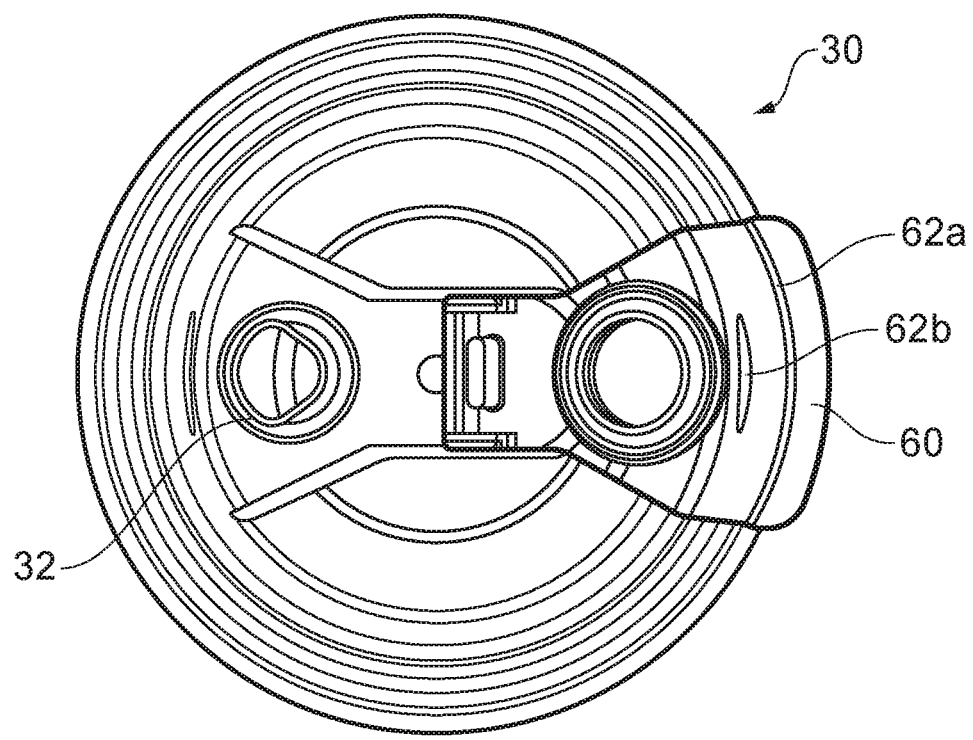
FIGS. 7a and 7b show above plan and under plan views of the lid for the first embodiment of the cup.
Figure 7B:
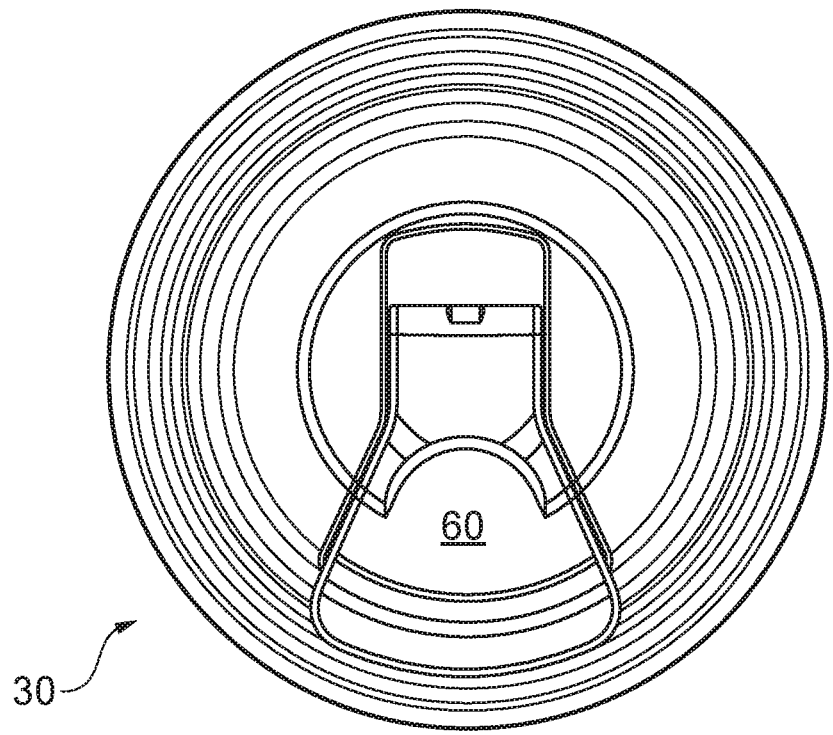
Figure 8A:
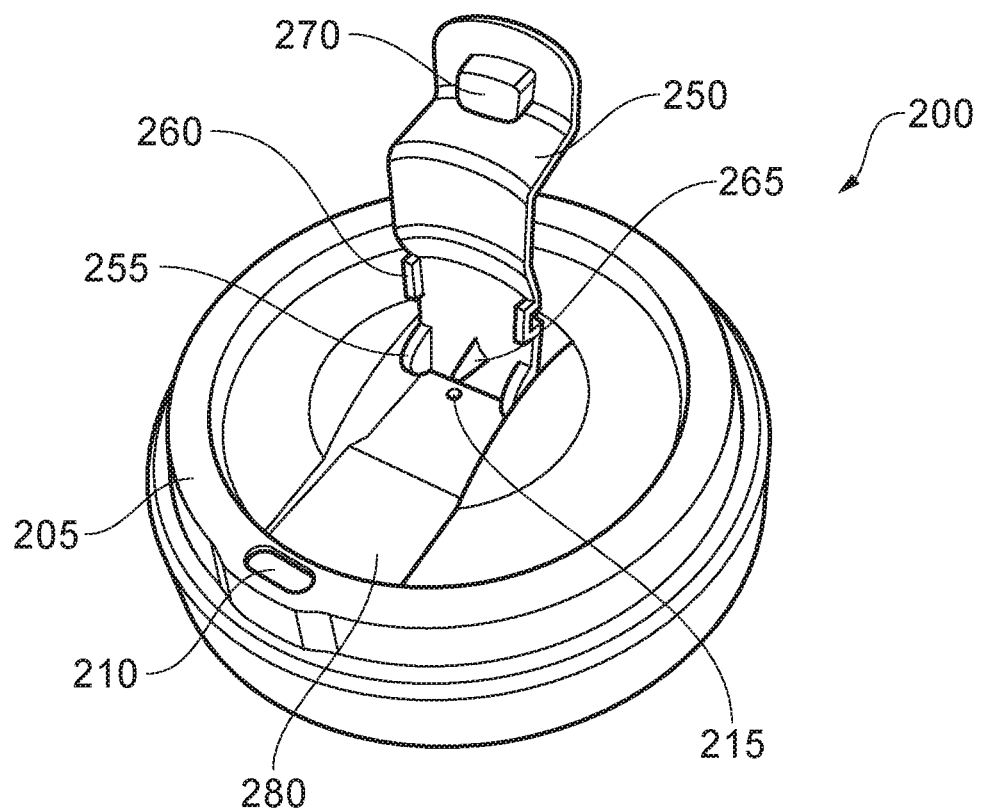
FIG. 8a shows an above view of a lid for a second embodiment of the cup with the stopper open.
Figure 8B:
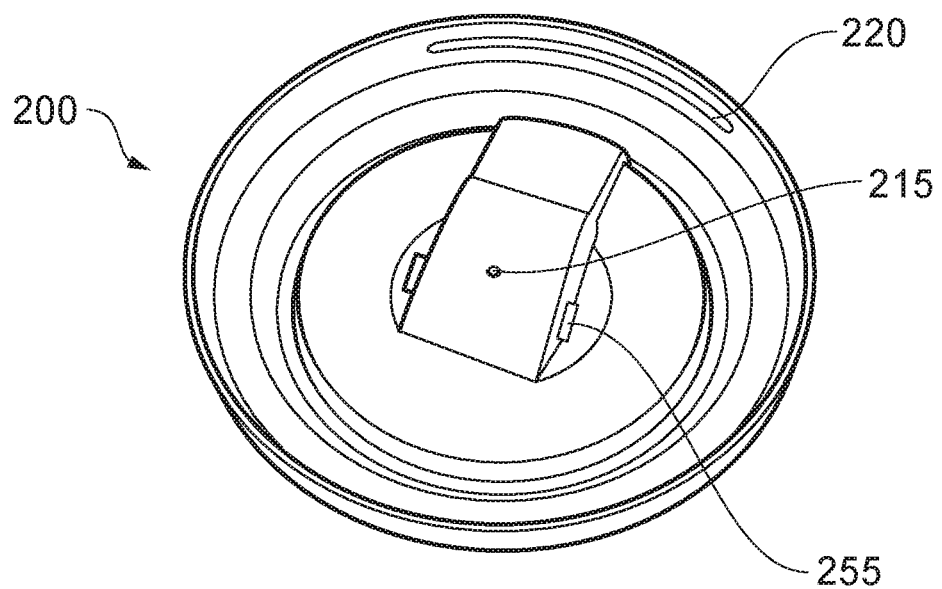
FIG. 8b shows a below view of the lid for the second embodiment of the cup.
Figure 9:
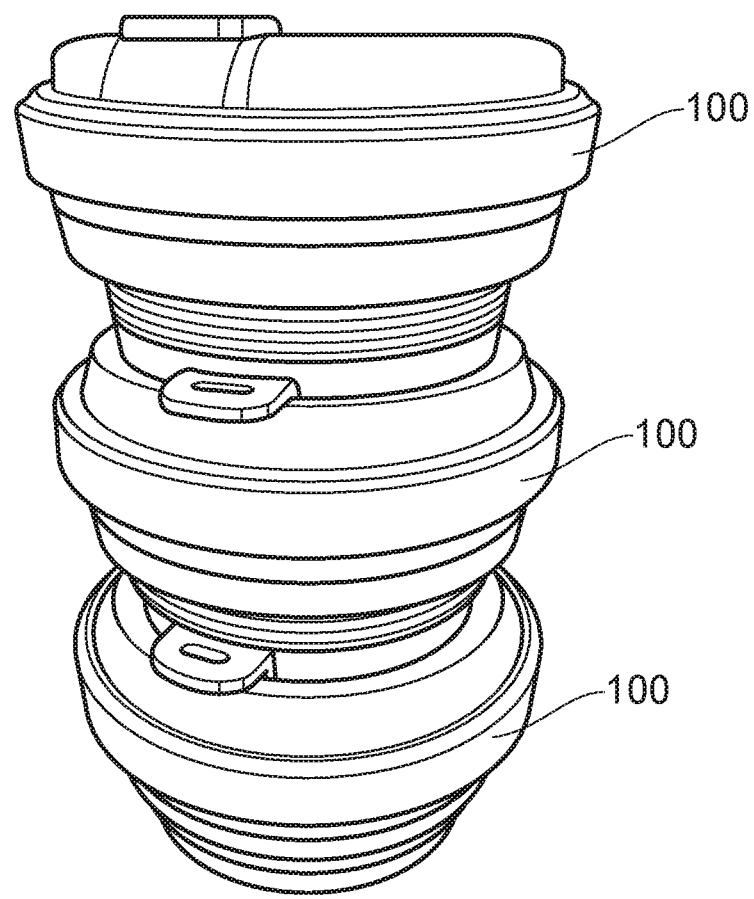
FIG. 9 shows a plurality of the cups of the second embodiment in the fully collapsed configuration stacked on top of each other.
Figure 10:
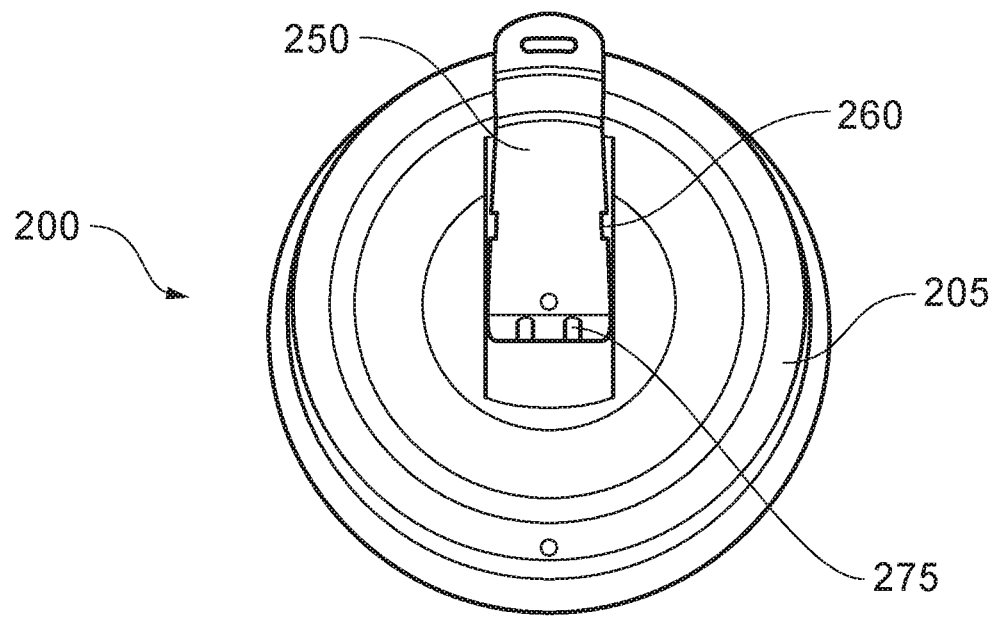
FIG. 10 shows an above view of the lid for the second embodiment of the cup with the stopper closed.

A lid 30 is shown in FIGS. 6 and 7. FIG. 6 shows a sectional view of the lid 30. FIGS. 7a and 7b show above plan and under plan views of the lid 30.

A drinking aperture 32 is suitably shaped and dimensioned to allow liquid contents (not shown) to flow at a comfortable and safe rate. The lid 30 seals the cup 10 and prevents leaks when stored. The edge 34 of the lid 30 is angled so as to assist to channel the liquid contents to the user's mouth and form a seal with the lips.

Referring to FIGS. 6, 7a and 7b there are shown views of the lid 30 with a hinged pivot type stopper 60, with a stay open latch 62 and an elastomer spout seal 64. The stopper 60 has a positive click detent 62a and 62b which is ideally audible so as to seal firmly and retain it when open. The stopper 60 is hinged so that when open it is held back so allowing the user to drink without interference from the stopper.

By adding a flanged or a winged base 50 the surface area is improved so making the cup more stable. Also when the base unit is in "stored" configuration the "wings" protect the softer thermoplastics elastomer material from accidental damage. The base 50 has three small pillars 52, 54 and 56 formed thereon in order to support it during the injection as well as stabilise the cup 10 in use. A mould tool (not shown) may be textured with a knurled, contoured, fluted or any other desired finish.

A method of manufacturing the reusable cup comprises the steps of: introducing a flexible rubber into a cavity injection mould, receiving a moulded cup body, the cup body has three peripheral sections or bands which are bonded to the cup body at regions that are connected by tapering portions of the cup body. Ideally the peripheral sections or bands are bonded to an outer surface of the cup body.

The preferred method of manufacture is a two shot injection moulding using a rotary turn table configuration. The three polypropylene bands are formed within the injection mould tool using core A. The mould opens leaving the rings in the cavity. The mould cavity indexes to align with core B. Mould tool closes and the thermo plastic elastomer is injected in through a hole in band 21 and across its inner surface. Three pips support the surface of 21 to ensure the thermo plastic elastomer flows through the hole and not across the back of band 21.

Once a sufficient amount of thermo plastic elastomer has passed through the hole, band 21 is pushed back against the mould surface and the three pips are no longer required. The continuing flow of the thermo plastic elastomer over the pips erodes them, this means they can no longer break through the thermo plastic elastomer and be visible from the inside of the cup, thereby leaving an unbroken and continuous internal surface which is easier to clean.

A blowing agent can be introduced into one or more of the polypropylene band(s) so as to improve its thermal insulating properties and provide a comfortable grip for a user to hold.

An inner surface of the middle band has a relieved form or pattern produced thereon in order to improve insulation.

The materials forming the cup are dishwasher safe for ease of maintenance and the interior is smooth so that no recesses are provided for material or liquid to egress into or for any residue, such as milk or sugar, to accumulate at corners or inaccessible regions, for example in crevices or between different components.

The materials, from which the cup is formed, as well as pigments, may be chosen such that they can be used in a microwave oven.

It is appreciated therefore that the reusable cup not only overcomes the problem of wastage of precious environmental resources, but also provides a unique foldable cup that can be carried in a pocket or purse and used to collect beverages, and folded away when empty, without risk of leakages or spillage from the folded cup.

It is presented as an eye-appealing receptacle which may be adorned with colours, icons or logos of particular sports teams, personalities or corporations. Ideally such icons or logos or trade marks may be printed or placed on the central band.

FIGS. 8 to 17 show the second embodiment of the cup 100, including a second embodiment lid 200. The second embodiment cup comprises a cup body formed from a liquid impervious flexible material. The cup body comprises an upper cylindrical portion 110, a central cylindrical portion 114 with a radius less than that of the upper portion and a base portion 118 which is also cylindrical, with a radius less than that of the central portion. The base portion 118 has a closed end, defining the base of the cup volume.

The cup body further comprise a frusto-conical upper folding hinge 112 and a frusto-conical lower folding hinge 116. The upper portion 110 is connected to the central portion 114 by the upper folding hinge 112. The central portion 114 is connected to the base portion by the lower folding hinge 116.

An upper band 120 is formed around the upper portion 110. A central band 125 is formed around the central portion 114. A base band 130 is formed around the base portion 118.

In use the frusto-conical folding hinges 112, 116 are configured to be collapsed by folding them in on themselves. By collapsing the end deploying the folding hinges, the cup 100 can be collapsed for storage, or can have its capacity varied.

In the large volume fully deployed configuration (shown in FIG. 11) both hinges 112, 116 are deployed fully thereby maximising the volume of the cup (to hold 475 ml beverages).

In the medium volume partially deployed configuration (shown in FIG. 17) the lower hinge 116 is collapsed, but the upper hinge 112 is deployed. This configuration is dimensioned to hold 300 ml beverages.

In the small volume partially deployed configuration (shown in FIG. 16) the lower hinge 116 is deployed, but the upper hinge 112 is collapsed. This configuration is dimensioned to hold 175 ml beverages.

In the fully collapsed configuration (shown in FIG. 14 and in FIG. 11), both hinges 112, 116 are collapsed. This configuration could hold a very small beverage and saves volume for transporting the cup when not in use.

When each hinge 112, 116 collapses, it folds around two circumferences, one at the top of the hinge, at the boundary with the cylindrical portion above the hinge, and one at the bottom of the hinge at the boundary with the cylindrical portion below the hinge. The bottom circumferential location of each hinge folds about the top of the band formed about the cylindrical portion below the hinge, Therefore, when the hinges are collapsed they have S-shaped cross sections, and the portion above the hinge and below the hinge adopt a nested concertina arrangement. The hinge portions of the cup body being turned inside out between the circumferential folding points when they are collapsed.

The upper 110, central 114 and base 118 portions, and upper 112 and lower 116 folding hinges are all formed from a single continuous piece of impervious flexible material such as TPE or silicone. The boundaries between the portions and the hinges being at the circumferential folding points and being determined by the change in the slope of the cup body.

The circumferential folding points, the portions, the folding hinges and the segments surrounded by bands ideally all have equal thicknesses.

The peripheral bands are formed from rigid plastics. Preferably polypropylene. They therefore provide structure to the cup, preventing the cup body from being compressed. Furthermore, the bands act as guides which ensure the folding hinges fold correctly.

The upper peripheral band 120 has a quarter turn external thread formed on its outer surface for the attachment of the lid 200.

Figure 11:
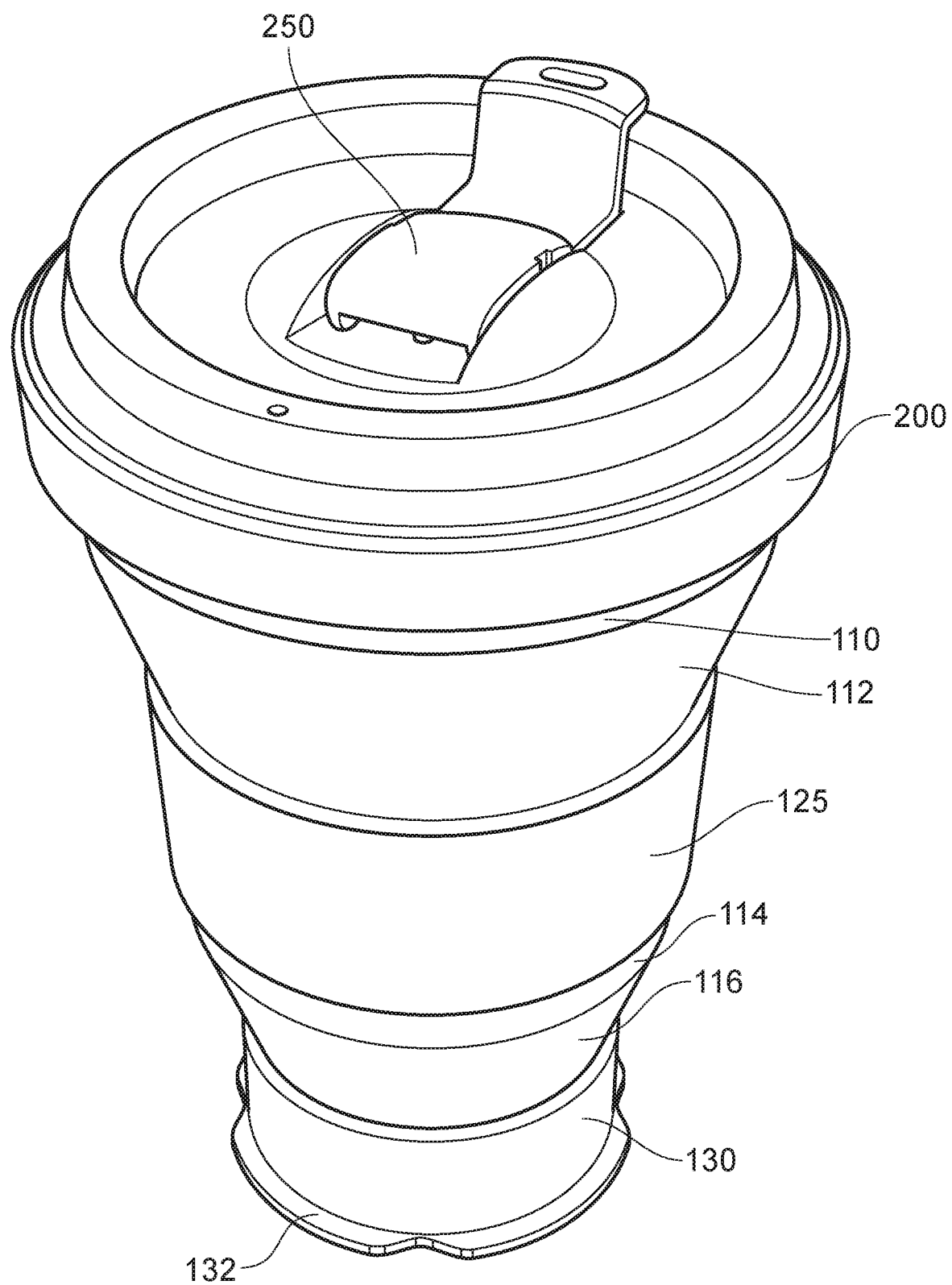
FIG. 11 shows a side view of the second embodiment of the cup in a fully deployed configuration.
Figure 12:
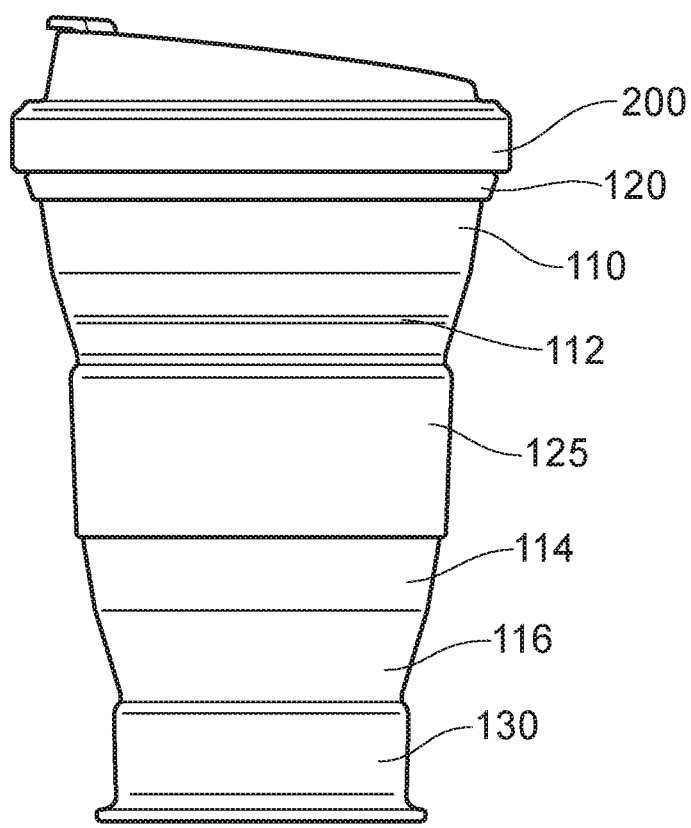
FIG. 12 shows a side view of the second embodiment of the cup in a partially collapsed configuration with the upper folding hinge partially collapsed and the lower folding hinge deployed.
Figure 13:
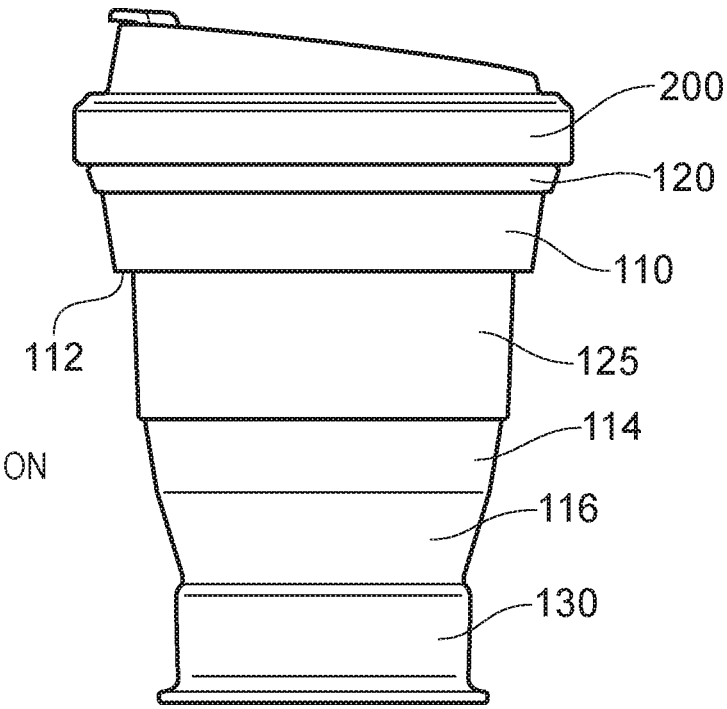
FIG. 13 shows a side view of the second embodiment of the cup in a partially collapsed configuration with the upper and lower folding hinges partially collapsed.
Figure 14:
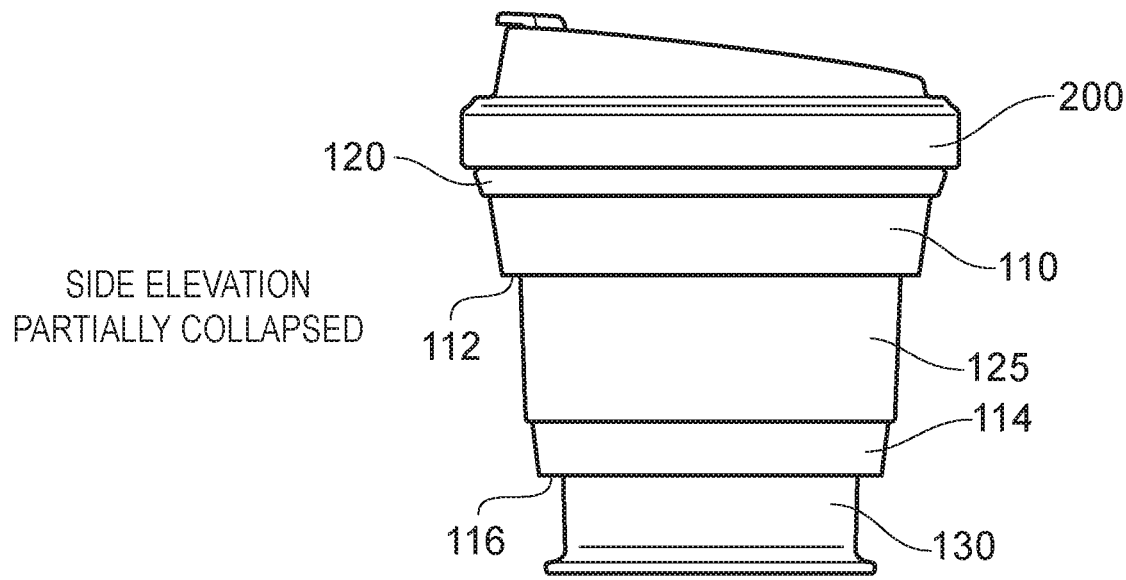
FIG. 14 shows a side view of the second embodiment of the cup in a fully collapsed configuration with the upper and lower folding hinges fully collapsed.
Figure 15:
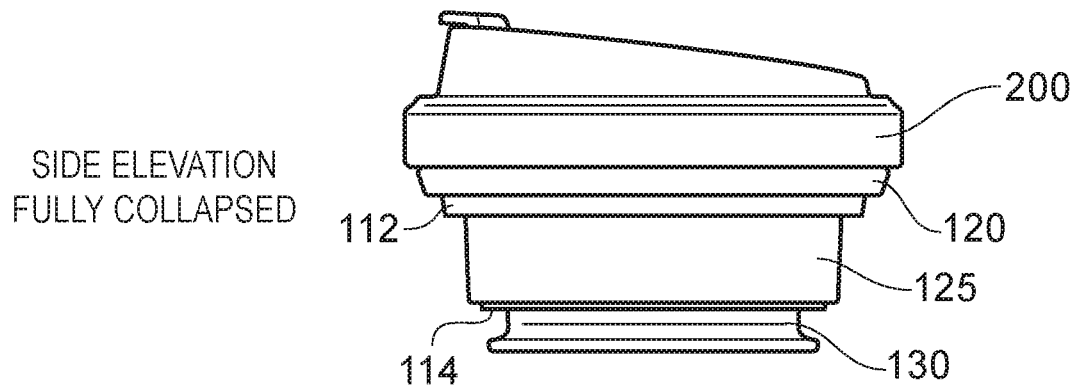
FIG. 15 shows an overall view of the second embodiment of the cup in a fully deployed configuration.
Figures 16, 17:
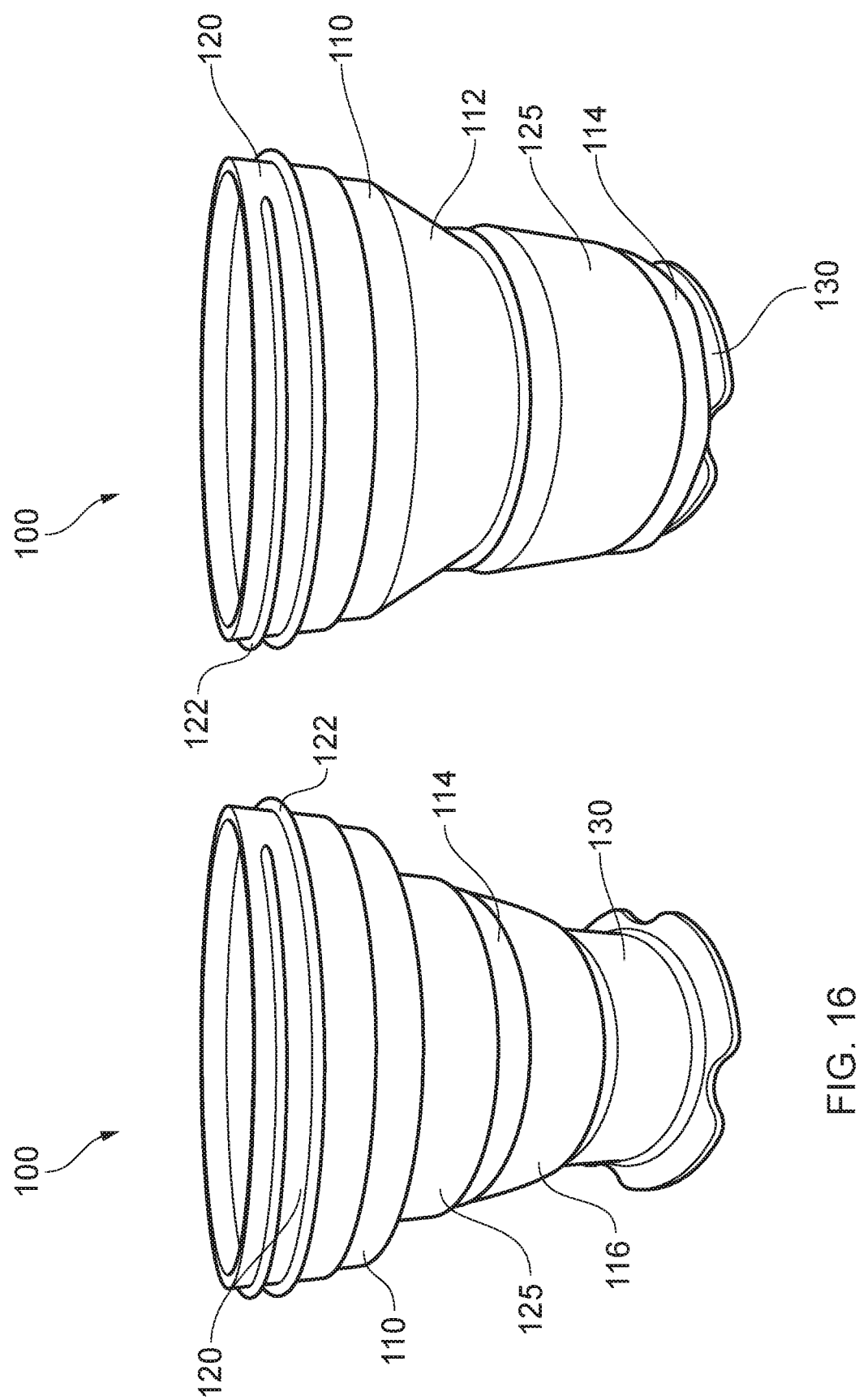
FIG. 16 shows an overall view of the second embodiment of the cup without the lid in a partially collapsed configuration with the upper folding hinge collapsed and the lower folding hinge deployed.
FIG. 17 shows an overall view of the second embodiment of the cup without the lid in a partially collapsed configuration with the upper folding hinge deployed and the lower folding hinge collapsed.
Figure 18:
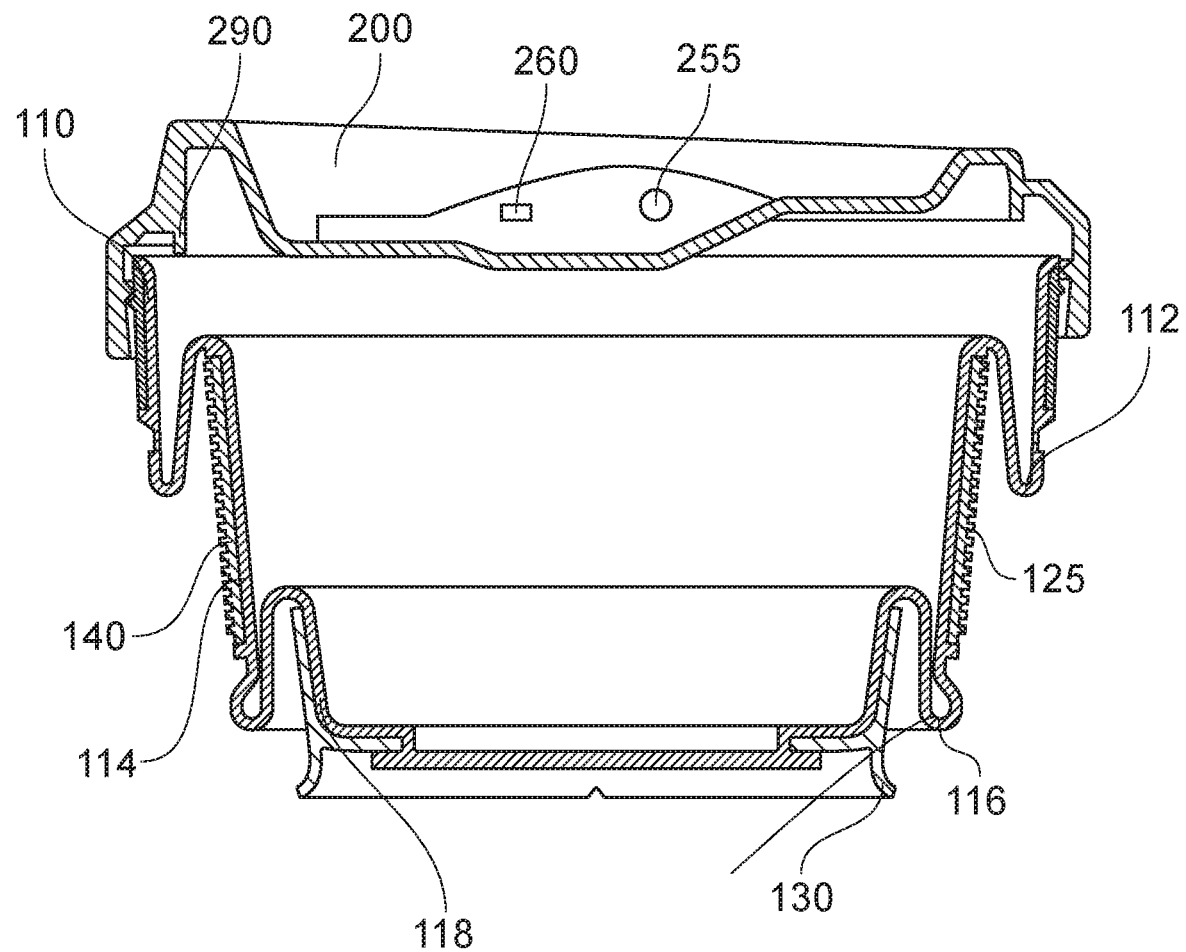
FIG. 18 shows a section view of the second embodiment of the cup.

The base peripheral band 130 extends below the bottom of the flexible cup body and therefore defines a rigid circular base upon which the cup is supported. Four radially extending flanges 132 protrude outwards from the bottom edge of the base portion of the cup 100, increasing the footprint of the cup and therefore its stability. The footprint of the base is dimensioned such that it fits within a central flat portion of the lid 200 which is surrounded by the ridge. This facilitates stacking of the cups, as seen in FIG. 11.

The lid 200 comprises a raised rim 205 which protrudes vertically above the surface of the lid 200. The drinking slot 210 is formed in the top of the rim 205. The rim slopes upwards towards the drinking slot 210, protruding further from the lid 200, the closer it is to the drinking slot 210 (this may be seen in FIGS. 12 to 15). The rim 205 has a slightly smaller radius than the aperture of the flexible cup body, such that the drinking slot 210 is above the volume of the cup but is adjacent to an edge of the cup volume, this advantageously reduces liquid residue build-up.

The lid has an internal screw thread 220, which in use meshes with the external screw thread 122 of the upper band 120, thereby attaching the lid 200 to the upper band 120.

The lid further comprises a stopper mechanism. The stopper mechanism comprising an arm 250 connected to the lid by hinges 255. The arm 250 rotates between a closed configuration where it is pressed into an indent 280 formed in the lid, and a continuum of open configurations, where it is rotated out of the indent 280.

The stopper mechanism comprises a bung 270 located on the underside of the arm 250 adjacent the opposite end of the arm 250 from the hinges 255. When arm is in the closed configuration the, stopper is pressed into the drinking slot 210. The stopper 270 is dimensioned such that it seals the drinking slot 210.

The lid comprises an air pressure hole 215 located near its centre. When the arm 250 is in the closed configuration a hole sealing post 265 presses against the air pressure hole 215, thereby sealing it.

The arm further comprises a pair of clips 260 which produce an audible click when the arm is moved between the closed and one of the open configurations, and which act to hold the arm in the closed configuration, thereby preventing the drinking slot and air pressure hole from becoming unsealed accidentally. The clips 250 may each comprise a protrusion from the wall of the indent 280 which interlocks with a groove, indent or slot in the side of the arm 250 when the stopper is in a closed configuration.

When in the closed configuration, the end of the arm 250 furthest from the hinges 255 protrudes beyond the raised rim 205 of the lid. This facilitates the opening of the stopper mechanism and allows the bung 270 to fit more tightly into the drinking slot 210 (This may be seen in FIG. 10).

The arm further comprises a pair of protrusions 275 on the end of the arm 250 adjacent the hinges 255. When the arm 250 is pivoted such that it extends vertically from the lid and as it is pivoted any further from the closed configuration, these protrusions are in contact with the lid 200. The friction due to the protrusions increases the angular moment required to pivot the arm 250, and therefore act retain the arm 250 in a wide open position, this ensures that the arm does not fall into contact with a user's face while they are drinking.

The central band 125 has a plurality of ridges formed thereon. A series of parallel horizontal ridges 140 are formed on the outer surface of the central band. These exterior ridges provide grip to a user and thermal insulation between the contents of cup and the user's hand by creating air pockets. A second series of wider and shallower vertical parallel ridges are formed on the inner surface of the central band, these provide thermal insulation by creating air pockets between the central band 125 and the central portion 114. The ridges cover the entire surface of both the inside and the outside of the central band 125, except for any regions of the band where names or logos are printed or embossed.

The upper portion 110 of the flexible cup shape extends vertically above the upper edge of the upper band 120, thereby forming a raised flexible rim. The raised flexible rim extends radially outwards such that it covers the upper edge of the upper band 120. This rim is compressed between the upper band 120 and the lid 200 when the lid is screwed onto the upper band 120, thereby providing a good seal between the upper portion 110 and the lid 120.

The upper portion 110 and the central portion 114 may have additional radially extending lips formed thereon (not shown). A first lip may be formed towards and parallel to the lower edge of the upper portion 110, and the bottom edge of the upper band 120 abuts this lip. Therefore, this lip and the raised flexible rim cover the top and bottom edges of the upper band 120 and fix its vertical position on the flexible cup body. A second lip may be formed around the top of the central portion 114 such that it abuts and covers the upper edge of the central band 125, and a third lip may be formed towards the bottom edge of the central portion 114 such that it abuts and covers the bottom edge of the central band 125. The second and third protruding lips define the location of the central band.

The lid 200 may comprise an internal downwards extending ridge 290 with a radius very slightly smaller than the radius of the aperture of the flexible cup body and arranged such that when the lid is attached to the cup the ridge projects downwards from the inner surface of the lid and presses against the inner wall of the flexible cup body. This ridge improves the seal between the lid 200 and the flexible cup body.

The bands 120, 125, 130 may be bonded to the outer surface of the flexible cup body.

It will also be appreciated that the invention has been described by way of examples only and variation to the aforementioned examples may be made, such as by combining features of the two embodiments, without departing from the scope of the invention, as defined by the appended claims

The invention claimed is:

1. A reusable cup comprising:
a cup body formed from a liquid impervious, flexible material, the cup body including an upper portion, a middle portion and a base portion and has foldable pre-forms arranged so as to define at least:
a first folding hinge around a first circumferential location interposed between the middle portion and the upper portion, and
a second folding hinge around a second circumferential location, separate from the first circumferential location, interposed between the base portion and the middle portion; and
an outer peripheral band formed around the middle portion of the cup body to provide a central band; wherein
the central band has at least one of indentations, undulations and crenellations formed thereon so as to provide thermal insulation;
the cup body is foldable into itself, at the first circumferential location to adopt a first, partially nested, concentric form, or at the second circumferential location to adopt a second, partially nested, concentric form, or at both the first circumferential location and the second circumferential location to adopt a third, nested, concentric form, to provide any of at least three different deployed functional forms, each of the three different deployed functional forms having a different functional capacity of the cup; and
the cup has a fourth, fully nested, concentric form for storage.

2. The reusable cup according to claim 1 wherein:
the base portion of the cup body folds up and into the middle portion of the cup, and
the top portion of the cup body folds over an exterior of the middle portion of the cup body.

3. The reusable cup according to claim 1 wherein when the cup is folded the cup body is folded back on itself so that in cross section an S-form is defined at each of the first folding hinge and the second folding hinge.

4. The reusable cup according to claim 1, further comprising:
frusto conical sections between the top portion and the middle portion of the cup body, and between the middle portion and the base portion of the cup body.

5. The reusable cup according to claim 1 wherein an inner surface of the central band has a relieved form or pattern produced thereon in order to improve insulation.

6. The reusable cup according to claim 1 further comprising a plurality of grooves formed on the central band at depths of at least 1 mm and with a minimum spacing of 0.6 mm.

7. The reusable cup according to claim 1 further comprising a lower outer peripheral band formed around the base portion of the cup.

8. The reusable cup according to claim 7 wherein the lower outer peripheral band includes a stand.

9. The reusable cup according to claim 8 further comprising a lip formed around the stand which provides a larger footprint for stability.

10. The reusable cup according to claim 1 further comprising an upper outer peripheral band formed around the upper portion of the cup.

11. The reusable cup according to claim 10 wherein the upper outer peripheral band defines a surface and a perimeter on which and around which a lid fits.

12. The reusable cup according to claim 10 further comprising an external thread formed on the upper outer peripheral band.

13. The reusable cup according to claim 10 wherein an excess liquid impervious, flexible material is provided around an upper periphery of the cup between the upper outer peripheral band and the cup body of the flexible material and provides a surface against which a lid may abut to seal the cup.

14. The reusable cup according to claim 1 wherein the liquid impervious, flexible material has a Shore hardness in excess of 20 Shore A.

15. The reusable cup according to claim 1 wherein a thickness of the liquid, impervious flexible material is between 1 mm and 2 mm.

16. The reusable cup according to claim 1 wherein a Shore hardness of the central band is between 50 Shore D and 70 Shore D.

17. The reusable cup according to claim 1 wherein a thickness of the central band is between 0.1 and 0.3 mm.

18. The reusable cup according to claim 1 wherein a width of the central band is between 15 mm and 70 mm.

19. The reusable cup according to claim 1 wherein a radius of the cup at the central band is between 18 mm and 34 mm.

20. The reusable cup according to claim 1 wherein the central band is adapted to act as a guide for the upper portion of flexible impervious material to fold against.

21. The reusable cup according to claim 1 wherein respective capacities of the at least three different deployed functional forms are 175 ml, 300 ml and 475 ml.

22. The reusable cup according to claim 1 further comprising a lid with a threaded portion.

23. The reusable cup according to claim 1 wherein the liquid impervious, flexible material is a thermoplastic elastomer.

24. The reusable cup according to claim 23 wherein the thermoplastic elastomer is a styrene-ethylene-butadiene-styrene (SEBS) based thermoplastic elastomer or silicone.

25. The reusable cup according to claim 1 wherein the outer peripheral band is formed from polypropylene or glass filled thermoplastic or thermo set plastics.

26. The reusable cup according to claim 1 further comprising:
a lid, wherein
the lid has a positive engagement means which engages when the lid is sealed around the cup.

27. The reusable cup according to claim 26, wherein the lid further has a threaded portion so that is can be screwed onto a thread defined in an upper peripheral band formed around the upper portion of the cup.

28. The reusable cup according to claim 26 wherein the lid further has a tab or stopper which opens.

29. The reusable cup according to claim 28 further comprising an air pressure hole.

30. A reusable cup according to claim 28 wherein the stopper clicks into place to spread rubber material under pressure against a drinking aperture.

31. A reusable cup according to claim 30 wherein the stopper is hinged so that when open it is held back.

32. A reusable cup according to claim 28 wherein the stopper has a soft rubber component, with a substantially rectangular cross section, disposed around an edge which compresses against a drinking aperture forming a spill-proof seal.

33. A reusable cup according to claim 30 wherein the lid is raised slightly at the drinking point for directing liquid to the user's mouth.

34. The reusable cup according to claim 28 further comprising a slot located proximal to an interior wall of the cup so as to ensure that all contents of the cup can be consumed by minimizing residue retained in the cup.

35. The reusable cup according to claim 28 further comprising a clip provided on the lid so as to engage with an exterior of the lid.

36. The reusable cup according to claim 1 further comprising an RFID chip.

37. A method of manufacturing the reusable cup according to claim 11 comprising the steps of: introducing a flexible rubber into a cavity injection mold, receiving a molded cup body, the cup body has three peripheral sections or bands which are bonded to the cup body at regions that are connected by tapering portions of the cup body.

38. A method of manufacturing the reusable cup according to claim 1 wherein peripheral sections or relatively rigid bands are bonded to an outer surface of the cup body.

39. A method of manufacturing the reusable cup according to claim 1 wherein a blowing agent is introduced into one or more polyurethane band(s) so as to improve its thermal insulating properties.

* * * * *